United States Patent
Lau et al.

(10) Patent No.: US 12,539,416 B2
(45) Date of Patent: Feb. 3, 2026

(54) METHOD AND APPARATUS FOR IMPROVEMENT OF MICROCIRCULATION

(71) Applicant: FAR EAST PYRAMID SDN BHD, Johor (MY)

(72) Inventors: Teik Hock Lau, Johor (MY); Junfeng Zhang, Johor (MY)

(73) Assignee: FAR EAST PYRAMID SDN BHD, Johor (MY)

( * ) Notice: Subject to any disclaimer, the term of this patent is extended or adjusted under 35 U.S.C. 154(b) by 1117 days.

(21) Appl. No.: 16/976,567

(22) PCT Filed: Jan. 31, 2019

(86) PCT No.: PCT/MY2019/050010
§ 371 (c)(1),
(2) Date: Aug. 28, 2020

(87) PCT Pub. No.: WO2019/199157
PCT Pub. Date: Oct. 17, 2019

(65) Prior Publication Data
US 2021/0046307 A1    Feb. 18, 2021

(30) Foreign Application Priority Data
Apr. 12, 2018 (MY) .......................... PI 2018701449

(51) Int. Cl.
*A61N 1/16* (2006.01)
*A61N 5/02* (2006.01)
*A61N 7/00* (2006.01)
*A61N 1/06* (2006.01)

(52) U.S. Cl.
CPC ................. *A61N 1/16* (2013.01); *A61N 5/02* (2013.01); *A61N 5/022* (2013.01); *A61N 7/00* (2013.01); *A61N 1/06* (2013.01); *A61N 2007/0004* (2013.01)

(58) Field of Classification Search
CPC ... A61N 1/16; A61N 1/06; A61N 5/02; A61N 5/022; A61N 7/00; A61N 2007/0004
See application file for complete search history.

(56) References Cited

U.S. PATENT DOCUMENTS

| | | | | |
|---|---|---|---|---|
| 5,544,665 | A * | 8/1996 | Litovitz | A61N 2/00 128/897 |
| 9,124,349 | B2 * | 9/2015 | Penafiel | H04W 24/08 |
| 10,103,763 | B2 * | 10/2018 | Butner | H04B 1/3838 |
| 2008/0020722 | A1 * | 1/2008 | Dandurand | A61N 2/06 428/206 |
| 2014/0343642 | A1 * | 11/2014 | Lauer | H05K 9/0001 607/115 |

* cited by examiner

*Primary Examiner* — Michael F Peffley
*Assistant Examiner* — Bo Ouyang
(74) *Attorney, Agent, or Firm* — MUNCY, GEISSLER, OLDS & LOWE, P.C.

(57) ABSTRACT

An apparatus and method for improving microcirculation by suppressing and cancelling the negative effects of electromagnetic radiation from cellular phones and computers connected to wireless networks on microcirculation. The apparatus generates frequencies that are synchronized and in opposed amplitudes to the detected electromagnetic radiation frequencies, thereby suppressing and cancelling the negative effects of the electromagnetic radiation frequencies on microcirculation.

19 Claims, 3 Drawing Sheets

METHOD AND APPARATUS FOR IMPROVEMENT OF MICROCIRCULATION

TECHNICAL FIELD

The present invention relates to a method and apparatus for improving circulation. The invention particularly relates to the improvement of microcirculation in the human body.

BACKGROUND ART

Microcirculation is the circulation of the blood in the smallest blood vessels, present within organ tissues. The microcirculation system is composed of terminal arterioles, capillaries, and venules. Microcirculation carries oxygenated blood to the capillaries, and blood flows out of the capillaries into the venules into the veins. The main functions of the microcirculation are the delivery of oxygen and nutrients and the removal of carbon dioxide. It also serves to regulate blood flow and tissue perfusion thereby affecting blood pressure and response to inflammation.

Microcirculation in the human body typically decreases when resting (sleeping), and as recently discovered, when the human body comes into contact with mobile devices and computers. Poor microcirculation is most prevalent in extremities such as hands and feet. The effects of poorer microcirculation includes lower oxygen transport, reduced waste removal leading to headache, fatigue, difficulty concentrating, numbness, tingling, cold extremities, heart and blood pressure problems.

Dr. Magda Havas, a professor of Environmental & Resource Studies at Trent University with a Ph.D. from the University of Toronto, completed a Post-Doctoral research at Cornell University that investigated the quality of the microcirculation of her test subjects after exposure to electromagnetic radiations from computers and mobile devices. The report revealed that these devices lowered the quality of microcirculation of their users to the level similar to cancer-stricken patients.

Therefore, there is a need for a method and/or apparatus that improves microcirculation through combating the negative effects of mobile devices and computers. The need for such a method and apparatus will only increase as the use of mobile devices and computers are constantly on the rise.

SUMMARY OF THE INVENTION

The principal object of the present invention is to provide a method and apparatus that suppresses the effects of electromagnetic radiations from personal computers and mobile devices that is causing decreased microcirculation. A further object of the present invention is to provide an apparatus that does not require physical contact with the human body to suppress the effects of the electromagnetic radiations.

According to one aspect of the invention, there is provided an apparatus for the improvement of microcirculation of the human body, the apparatus comprising:
  a detector to detect frequencies and their accompanying amplitudes of electromagnetic radiation in the air;
  a resonator and a dampening circuit to modulate a sinusoidal waveform at 36 MHz and its accompanying harmonics up to 2.6 GHz;
  a processor having inputs for receiving the detected frequencies and amplitudes of the electromagnetic radiation from the detector and the modulated sinusoidal waveform and its accompanying harmonics from the resonator, the processor adapted to selectively amplify the modulated sinusoidal waveform and its harmonics according to the detected frequencies of the electromagnetic radiation in the air and in opposing amplitudes to the amplitudes of the detected frequencies; and
  an antenna to broadcast the amplified sinusoidal waveform and its harmonics.

The apparatus picks up electromagnetic radiation in the air, analyzes its frequencies, phases and amplitudes, and chooses which sinusoidal waveform and its accompanying harmonics generated by the 36 MHz oscillator and the dampening circuit to amplify based on the detected frequencies and their amplitudes in the air. The processor further amplifies the selected frequencies generated by the 36 MHz oscillator in opposing amplitudes to the detected frequencies and their amplitudes.

The apparatus is advantageous over currently existing circulation enhancing technologies in that it does not require any physical contact with the user to function. Currently existing technologies typically require the user either wear a device or its extension for circulation enhancement to take place. Such requirement to either wear a device or make constant contact with it severely restricts the user's movements. Prolonged use of the device will be very uncomfortable for the user. The apparatus according to an embodiment of the present application is therefore very favorable as it allows the user to carry on his or her daily activities without hindrance.

According to one embodiment, the apparatus is portable.

The apparatus may measure anywhere from palm sized to the size of a computer tablet, so is therefore portable.

According to another embodiment, the apparatus further comprises a rechargeable portable power source.

The apparatus may operate from a rechargeable and portable power source, such as a lithium ion battery.

In another embodiment, the maximum output power of the apparatus is 20 dBm and 0.08 watts.

According to one feature, the maximum coverage of the apparatus is 8 meters.

According to another aspect, there is provided a method for the improvement of microcirculation of the human body, the method comprising:
  detecting frequencies and amplitude of electromagnetic radiation in the air;
  modulating a sinusoidal waveform at 36 MHz along with its accompanying harmonics up to 2.6 GHz;
  selectively amplifying the sinusoidal waveform and its harmonics according to the detected frequencies of the electromagnetic radiation in the air and in opposing amplitudes to the amplitudes of the detected frequencies; and
  broadcasting the amplified sinusoidal waveform and its harmonics.

BRIEF DESCRIPTION OF THE DRAWINGS

The invention will be described in conjunction with the following drawings which are only for the purpose of illustrating the embodiments of the present invention, and not for the purpose of limiting the present invention.

DETAILED DESCRIPTION

The invention is described in detail in reference to the example below.

Figure 1:
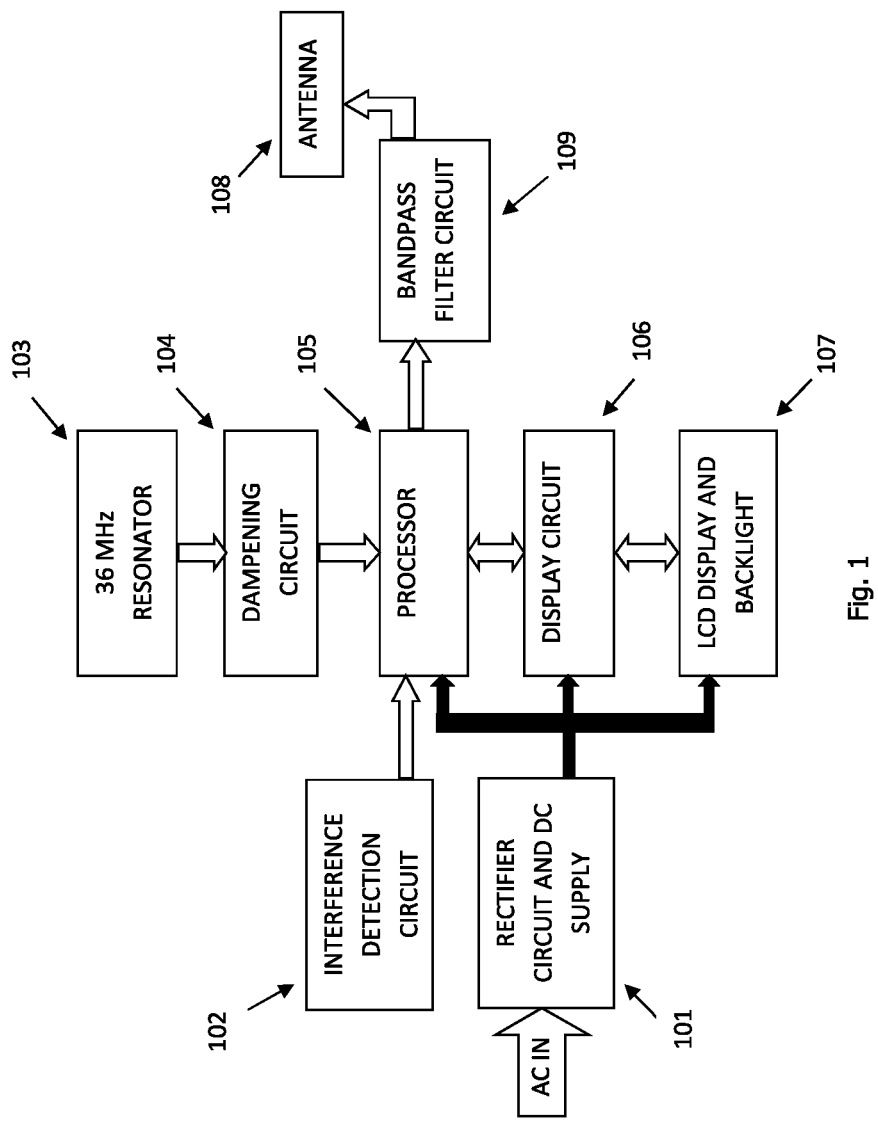
FIG. 1 illustrates the block diagram of an apparatus for suppressing the negative effects on microcirculation caused by devices that generate electromagnetic radiation according to an embodiment of the present invention.

An apparatus according to an embodiment of the present invention according to FIG. 1 consists a rectifier circuit/DC supply circuit 101 and an interference detection circuit 102. As the primary components within the apparatus run on 5V DC, at least three variants of the apparatus are possible:

1) The apparatus powered solely by AC,
2) The apparatus powered by either AC or DC, and
3) The apparatus powered solely by DC.

The AC or AC/DC variants of the apparatus can receive AC input from a wall outlet anywhere from 100V to 240V AC (60 Hz or 50 Hz). A stepdown transformer (not shown) is used to convert the AC input anywhere from 100V to 240V AC down to 5V AC. The rectifier circuit/DC supply circuit 101 converts the 5V AC to pulsating 5V DC, and the pulsating 5V DC is then filtered within the rectifier circuit/DC supply circuit 101 using a suitable capacitor to remove all the ripples to obtain a pure 5V DC.

It should be appreciated that the DC-only version of the apparatus, i.e. one that is powered solely by either manganese batteries, alkaline batteries, lithium batteries or rechargeable lithium ion battery packs is entirely possible by simply bypassing all the AC requirements above. Due to the lack of an AC transformer, rectifier circuit etc., the DC-only version of the apparatus is highly portable.

The rectifier circuit/DC supply circuit 101 supplies 5V DC to a processor 105, a display circuit 106 and an LCD display and backlight module 107. The processor 105 is connected to the interference detection circuit 102.

When the device is switched on, the interference detection circuit 102 detects the electromagnetic radiations in the air and provides the details of the detected radiation to the processor 105. The values provided to the processor 105 include at least the frequencies of the radiation, the phasing of each frequency, and the amplitudes of each detected frequency.

Due to the fundamental characteristics of sine waves, the 36 MHz resonator 103 will naturally produce harmonics of 36 MHz when dampened by the dampening circuit 104. A 36 MHz resonator will therefore output second, third, fourth, fifth etc. harmonics of 36 MHz by the order of n, where n is 1, 2, 3, 4, 5 . . . etc.

In the apparatus based on an embodiment of the present invention, the 36 MHz resonator 103 along with the dampening circuit 104 will generate sinusoidal waveforms at 36 MHz along with its harmonics.

Based on the frequencies of the electromagnetic radiation detected by the interference detection circuit 102, the processor selects which of the harmonics of the 36 MHz above to amplify (including the base sinusoidal waveform of 36 MHz), so that the amplitudes of the amplified sinusoidal waveform and its harmonics match those of the detected frequencies in the air, but in opposing amplitudes.

The apparatus need only to output cancellation frequencies that are in multiples of 36 MHz up to 2.6 GHz only, as radiation frequencies above 2.6 GHz do not appear to have any adverse effects on microcirculation. The apparatus will output the following cancellation frequencies when the same frequencies of electromagnetic radiation are detected in the air: 36 MHz, 72 MHz, 108 MHz, 144 MHz, 180 MHz, 216 MHz, 252 MHz, 288 MHz, 324 MHz, 360 MHz, 396 MHz, 432 MHz . . . up to 2.6 GHz.

The amplified waveform and harmonics (collectively referred to as cancellation frequencies), are then applied to a built-in antenna 109 within the apparatus. When excited by the cancellation frequencies' alternating current, the built-in antenna 109 radiates these frequencies (36 MHz, 72 MHz, 108 MHz, etc.) into the air. As these cancellation frequencies have opposing amplitudes to their corresponding radiation frequencies in the air, they suppress each other or cancel each other out altogether. It is important that the processor 105 synchronizes the cancellation frequencies to those radiation frequencies detected in the air for the suppression and cancellation effects to work.

The dampening circuit 104 in combination with the bandpass filtering circuit 108 are required to ensure the output power of the cancellation frequencies are within CE EMC standard. Under the present embodiment of the invention, the broadcast power of the apparatus is set at 20 dBm and 0.08 W so that the apparatus has an effective range of 8 meters. This prevents two adjoining apparatuses according to an embodiment of the present invention to interfere with each other and end up cancelling out the beneficial effects of their outputs.

Depending on the design, the display circuit 106 in combination with the LCD display and blacklight module 107 may provide information of the radiation frequencies expect to clearance percentage. The LCD display's main purpose is to inform the user that the apparatus is in operation.

Figure 2:
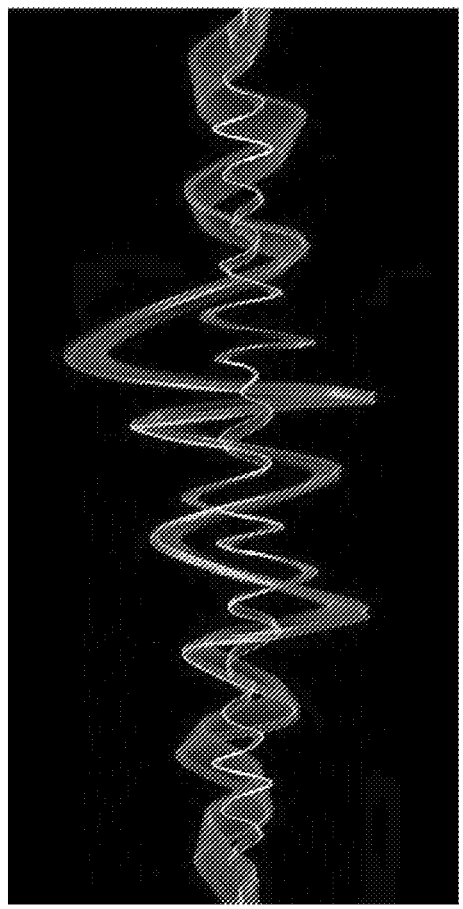
FIG. 2 is the frequency output of the apparatus in accordance to an embodiment of the present invention.

FIG. 2 shows the output sinusoidal wave pattern of the apparatus, as read by a typical laboratory oscilloscope. As the output of the apparatus contains harmonics amplified at different levels according to the frequencies of the electromagnetic radiation detected, the frequency pattern will change according to the apparatus' environment. For example, in an area where there is strong electromagnetic radiation frequency of 900 MHz, the apparatus will amplify cancellation frequency of 900 MHz (36 MHz×25), to suppress any negative effects this radiation has on microcirculation.

Figure 3:
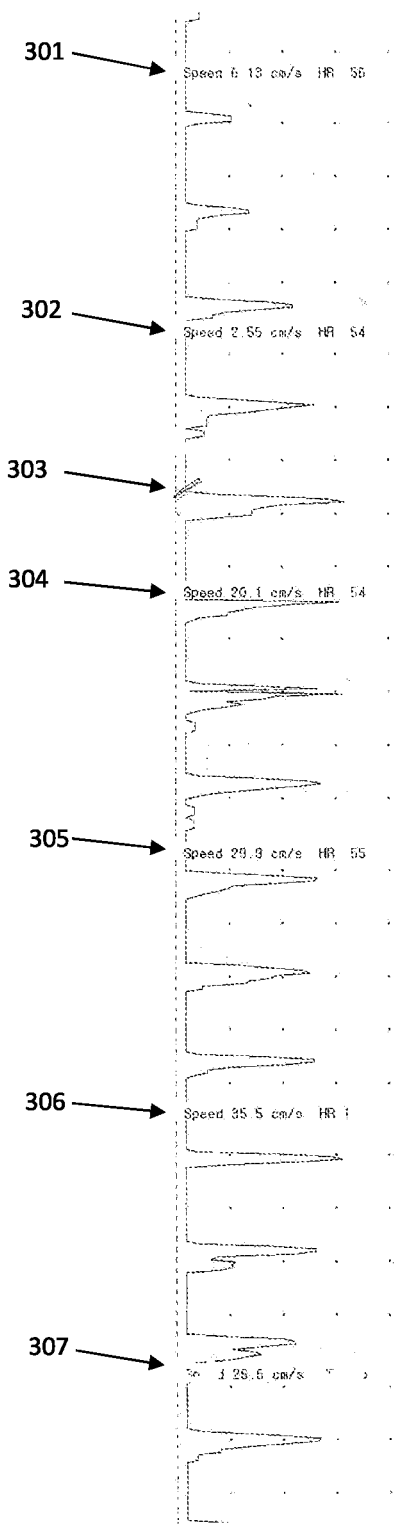
FIG. 3 illustrates the effect of the apparatus on the blood flow of a test subject according to an embodiment of the present invention.

The beneficial effect of the apparatus according to an embodiment of the present invention is recorded by a blood flow measuring device. FIG. 3 shows the output graph of the measuring device against time (time is not shown on the graph). The device measures the microcirculation of the test subject's finger when the subject is first subject to electromagnetic radiation via a cellphone, and then the electromagnetic radiation effect of the cellphone is suppressed using the apparatus according to an embodiment of the present invention. As can be seen in the graph, the initial microcirculation rate of the test subject's finger is 6.13 cm/s at time marker 1, 301. When the test subject makes contact with a cellular phone at time marker 2, 302, the test subject's microcirculation drops to 2.55 cm/s. After the apparatus is turned on at time marker 3, 303, the measuring device detects a spike in the microcirculation to 20.1 cm/s at time marker 4, 304. The flow rate continues to increase to 29.9 cm/s at time marker 5, 305, and then 35.5 cm/s at time marker 6, 306, and eventually stabilizes at 26.6 cm/s at time marker 7, 307 of the graph.

It can therefore be surmised that the invention can effectively suppress the negative effects of electromagnetic radiation on microcirculation from either handheld cellular device or computers connected to wireless networks.

Even though the above example has detailed the invention in a unique embodiment, it is by no means exhaustive. It is therefore to be understood that the invention may be embodied in numerous other ways without departing from the scope of the invention.

The invention claimed is:

1. An apparatus for improvement of microcirculation of a human body, the apparatus comprising:
   a detector to detect frequencies and their accompanying amplitudes of electromagnetic radiation in air;
   a 36 MHz resonator dampened by a dampening circuit and configured to produce and modulate a sinusoidal waveform at 36 MHz and its accompanying harmonics by an order of n up to 2.6 GHz, wherein n is an integer;
   a processor having inputs for receiving the detected frequencies and the amplitudes of the electromagnetic radiation from the detector and the modulated sinusoidal waveform and its accompanying harmonics from the resonator, the processor adapted to, as a result of receiving the detected frequencies and the amplitudes of the electromagnetic radiation from the detector, selectively amplify the modulated sinusoidal waveform and its harmonics according to the detected frequencies of the electromagnetic radiation in the air and in opposing amplitudes to the amplitudes of the detected frequencies; and
   an antenna to broadcast the amplified sinusoidal waveform and its harmonics as a result of the detector detecting the frequencies and the amplitudes of the electromagnetic radiation.

2. The apparatus for the improvement of microcirculation of the human body according to claim 1, wherein the apparatus is portable.

3. The apparatus for the improvement of microcirculation of the human body according to claim 2, wherein the apparatus further comprises a rechargeable portable power source.

4. The apparatus for the improvement of microcirculation of the human body according to claim 3, wherein the maximum output power of the apparatus is 20 dBm and 0.08 watts.

5. The apparatus for the improvement of microcirculation of the human body according to claim 4, wherein the apparatus has an effective range of 8 meters from the antenna.

6. The apparatus for the improvement of microcirculation of the human body according to claim 3, wherein the maximum output power of the apparatus is 20 dBm and 0.08 watts.

7. The apparatus for the improvement of microcirculation of the human body according to claim 6, wherein the apparatus has an effective range of 8 meters from the antenna.

8. The apparatus for the improvement of microcirculation of the human body according to claim 3, wherein the apparatus has an effective range of 8 meters from the antenna.

9. The apparatus for the improvement of microcirculation of the human body according to claim 2, wherein the maximum output power of the apparatus is 20 dBm and 0.08 watts.

10. The apparatus for the improvement of microcirculation of the human body according to claim 9, wherein the apparatus has an effective range of 4 meters from the antenna.

11. The apparatus for the improvement of microcirculation of the human body according to claim 2, wherein the apparatus has an effective range of 8 meters from the antenna.

12. The apparatus for the improvement of microcirculation of the human body according to claim 1, wherein the maximum output power of the apparatus is 20 dBm and 0.08 watts.

13. The apparatus for the improvement of microcirculation of the human body according to claim 12, wherein the apparatus has an effective range of 8 meters from the antenna.

14. The apparatus for the improvement of microcirculation of the human body according to claim 1, wherein the apparatus has an effective range of 8 meters from the antenna.

15. The apparatus according to claim 1, further comprising a display circuit to provide information associated with the broadcasted amplified sinusoidal waveform and its harmonics.

16. The apparatus according to claim 1, further comprising a dampening circuit and a bandpass filtering circuit, wherein the dampening circuit and the bandpass filtering circuit are configured to, before the antenna broadcasts the amplified sinusoidal waveform and its harmonics, modify the amplified sinusoidal waveform and its harmonics so a maximum output power of the apparatus is below a threshold.

17. A method for improvement of microcirculation of a human body, the method comprising:
    detecting frequencies and amplitude of electromagnetic radiation in air;
    modulating a sinusoidal waveform at 36 MHz along with its accompanying harmonics by an order of n up to 2.6 GHz, wherein n is an integer;
    as a result of detecting the frequencies and the amplitude of the electromagnetic radiation, selectively amplifying the sinusoidal waveform and its harmonics according to the detected frequencies of the electromagnetic radiation in the air and in opposing amplitudes to the amplitudes of the detected frequencies; and
    as a result of detecting the frequencies and the amplitude of the electromagnetic radiation, broadcasting the amplified sinusoidal waveform and its harmonics.

18. The method according to claim 17, further comprising detecting a phase for each frequency of the frequencies of electromagnetic radiation.

19. The method according to claim 17, wherein:
    detecting the frequencies and the amplitude of the electromagnetic radiation in the air comprises detecting a first set of frequencies of the electromagnetic radiation at a first time and detecting a second set of frequencies of the electromagnetic radiation at a second time, and
    selectively amplifying the sinusoidal waveform and its harmonics comprises selectively amplifying the sinusoidal waveform and its harmonics according to the first set of frequencies and, after amplifying the sinusoidal waveform and its harmonics according to the first set of frequencies, selectively amplifying the sinusoidal waveform and its harmonics according to the second set of frequencies.

* * * * *